US010552654B2

(12) United States Patent
Beckmann et al.

(10) Patent No.: US 10,552,654 B2
(45) Date of Patent: Feb. 4, 2020

(54) SUPPORT FOR THE REPOSITION AND FINDING OF OBJECTS IN A REPOSITORY FACILITY

(71) Applicants: Clemens Beckmann, Köln (DE); Christian Kasper, Brühl (DE); Holger Schneebeck, Köln (DE)

(72) Inventors: Clemens Beckmann, Köln (DE); Christian Kasper, Brühl (DE); Holger Schneebeck, Köln (DE)

(73) Assignee: Deutsche Post AG, Bonn (DE)

( * ) Notice: Subject to any disclaimer, the term of this patent is extended or adjusted under 35 U.S.C. 154(b) by 104 days.

(21) Appl. No.: 15/950,970

(22) Filed: Apr. 11, 2018

(65) Prior Publication Data
US 2018/0300516 A1 Oct. 18, 2018

(30) Foreign Application Priority Data

Apr. 12, 2017 (EP) .................. 17166232

(51) Int. Cl.
| | | |
|---|---|---|
| *G06K 9/00* | (2006.01) | |
| *G06K 7/10* | (2006.01) | |
| *H04W 4/35* | (2018.01) | |
| *G06Q 50/28* | (2012.01) | |

(52) U.S. Cl.
CPC ..... *G06K 7/10861* (2013.01); *G06K 9/00671* (2013.01); *G06Q 50/28* (2013.01); *H04W 4/35* (2018.02)

(58) Field of Classification Search
CPC ...... G06Q 10/087; G06Q 10/08; G06Q 50/28; G06K 7/10861; G06K 9/00671; H04W 4/35
See application file for complete search history.

(56) References Cited

U.S. PATENT DOCUMENTS

| 9,171,278 | B1* | 10/2015 | Kong | G06Q 10/087 |
|---|---|---|---|---|
| 10,339,497 | B2* | 7/2019 | Gabbai | G06Q 10/087 |
| 2002/0118111 | A1* | 8/2002 | Brown | G06Q 10/087 |
| | | | | 340/573.1 |
| 2014/0025543 | A1* | 1/2014 | Phillips | G06K 9/00771 |
| | | | | 705/28 |
| 2017/0323502 | A1* | 11/2017 | Hall | H04W 4/35 |
| 2018/0165857 | A1* | 6/2018 | Lee | G06F 3/011 |

FOREIGN PATENT DOCUMENTS

| WO | WO 2009/027835 A2 | 3/2009 |
|---|---|---|
| WO | WO 2014/053436 A1 | 4/2014 |

* cited by examiner

*Primary Examiner* — Shefali D Goradia
(74) *Attorney, Agent, or Firm* — Reinhart Boerner Van Deuren P.C.

(57) ABSTRACT

As disclosed herein, an apparatus receives data from sensors that are arranged in a repository facility so they can capture repository locations of the repository facility and a path in the repository facility. It derives an identification and a position of an object in the repository facility from the received data. It causes storage of the position of the object in association with its identification if a position is not yet stored for the object. If a position is already stored for the object, the apparatus checks the position on the basis of the derived position and causes storage of the derived position in the event of a change. On obtaining an enquiry in regard to the position of an object in the repository facility, the apparatus reads a position of the object, stored in association with the identification of the object, and provides information regarding the position.

20 Claims, 5 Drawing Sheets

SUPPORT FOR THE REPOSITION AND FINDING OF OBJECTS IN A REPOSITORY FACILITY

CROSS-REFERENCE TO RELATED PATENT APPLICATION

This patent application claims priority to European Application No. 17166232.3, filed Apr. 12, 2017, the entire teachings and disclosure of which are incorporated herein by reference thereto.

FIELD OF THE INVENTION

The present invention relates to the use of repository facilities, and in particular to a method, an apparatus and a computer program for support for the repositoring and finding of objects in a repository facility, and also to a system in which such support is implemented.

BACKGROUND OF THE INVENTION

Repository facilities are used for depositing objects for a plurality of fields of use.

As such, a repository facility in post offices or parcel shops, for example, can be used for depositing packages until they are collected by addressees or until they are returned to the sender on account of collection not having taken place. In another field of use, a repository facility can be used for depositing different goods until they are sent to customers.

Depositing in a repository facility can take place in different ways in this case.

In a permanent space system, each object has a particular repository location predefined for it on the basis of a predetermined criterion. In the case of goods, it may be the type of the good, for example; in the case of packages, the time of arrival or an identifier provided by a barcode. In the case of a chaotic storage, each object can be accommodated in any desired suitable repository location. Hybrid forms are possible.

BRIEF DESCRIPTION OF SOME EXEMPLARY EMBODIMENTS OF THE INVENTION

One of the objects of the invention is to allow particularly efficient use of a repository facility.

Embodiments of the invention are described herein.

An exemplary embodiment of a method according to the invention comprises receiving data of a plurality of sensors that are arranged in a repository facility such that they can capture at least repository locations of the repository facility and at least one path in the repository facility. The method further comprises deriving at least an identification and a position of at least one object in the repository facility from the received data. The method further comprises causing a storage of the position of the at least one object in association with its identification if a position is not yet stored for the at least one object. The method further comprises, if a position is already stored for the at least one object, checking the position stored for the at least one object on the basis of the derived position and causing a storage of the derived position in the event of a change. The method further comprises, on obtaining an enquiry in regard to the position of an object in the repository facility, wherein the enquiry includes data that allow an identification of the object to be derived, reading a position of the object, stored in association with the identification, and providing information in regard to the position of the object. The method can be performed by an apparatus or by a group of apparatuses.

An exemplary embodiment of an apparatus according to the invention comprises means for causing the apparatus or a system to perform an arbitrary embodiment of the method according to the invention. The means can comprise, by way of example, at least one memory with program instructions and at least one processor. The at least one processor may be configured to execute program instructions on the at least one memory. The program instructions may be configured to cause the apparatus or the system to perform an arbitrary embodiment of the method according to the invention when they are executed by the at least one processor. The memory may be a volatile or nonvolatile memory. The memory may be removable or permanently integrated in the apparatus. The apparatus can comprise arbitrary further components. It goes without saying that the means may alternatively, at least partially, also be realized in circuitry. The apparatus according to the invention may be a computer, for example. Such a computer can act as a server for a particular repository facility or as a server for a plurality of repository facilities, for example. The apparatus according to the invention may likewise be a module for an arbitrary computer.

An exemplary embodiment of a system according to the invention comprises an arbitrary embodiment of an apparatus according to the invention and moreover the plurality of sensors of at least one repository facility, and/or a transportation device for transporting objects, and/or at least one data memory. The system can comprise arbitrary further elements.

An exemplary embodiment of a computer program according to the invention comprises program instructions that are configured to cause an apparatus or a system to perform an arbitrary embodiment of the method according to the invention when they are executed by at least one processor.

The computer program may be stored in a tangible computer-readable medium, for example in a volatile or nonvolatile program memory of an apparatus or on a memory chip or memory stick. Alternatively, it can be transmitted via the Internet and/or via wired lines.

Efficient use of a repository facility is based on continuously correct reposition of objects—whether as a result of a drop at a particular provided location or as a result of reliable documentation of a respective drop at an arbitrary location. Both approaches mean substantial effort for the repository personnel. Both approaches can moreover encounter errors by the repository personnel, which can make finding objects extremely complex.

For particular exemplary embodiments, the invention therefore provides for the position of objects in a repository facility to be determined on the basis of data of a plurality of sensors and stored and for the stored position to be updated as required. Suitable arrangement and orientation of the plurality of sensors in this case allows objects in all of the repository locations of the repository facility and on all of the access paths to the repository locations to be captured, for example. The stored position of an object can in this case always or normally be understood to mean a position of the object in a repository location and/or to mean a position of the object that has not undergone a change, according to sensor data, subsequently to a movement within a prescribed period. If the position is stored in association with an identification of the object, the position of a particular object can then always be immediately and reliably retrieved on the basis of the identification.

The sensor-based capture of the objects in the repository facility allows the positions of objects to be documented with little time involvement and particularly correctly. The possibility of changing stored position statements also assists in tracking relocations of objects in the repository facility. The invention therefore allows the reposition and finding of objects in a repository facility to be speeded up. Capture of the paths on which the objects are transported in the repository facility can provide additional information for determining a position of an object that is to be stored.

In one exemplary embodiment, determining a position of the at least one object in the repository facility from the received data comprises tracking a path of the at least one object in the repository facility on the basis of received data from at least one of the plurality of sensors that captures at least one path in the repository facility. In this case, tracking can take place at the same time as the data capture, or with a time lag (tracing). By way of example, it can fundamentally take place at least during initial reposition of an object and/or in the event of the object being relocated, or only if the position of an object cannot or cannot explicitly be determined by means of the capture of the repository locations.

The plurality of sensors comprises at least two, but preferably at least three, sensors that are arranged for the purpose of capturing repository locations and at least one path. The number of sensors is chosen by way of example, but not necessarily, such that it is possible for an object in the repository facility to be tracked without shadowing.

The plurality of sensors can be chosen arbitrarily provided that the data delivered by them allow a captured object to be identified and its position to be determined. The sensors can comprise imaging sensors of cameras, for example. In that case, the captured data comprise image data. The cameras used can be selected arbitrarily in this case. They may be infrared cameras or grayscale or RGB color cameras, for example. Other sensors can likewise be used, such as sensors for optical distance measurement between imaging sensors and/or between a sensor and an object. One possibility in this case is a sensor of a TOF (time of flight) camera, for example, which captures the delay time of reflected signals. Such a sensor may be an infrared sensor, for example. An infrared sensor allows an object placed in the capture area to be measured by means of pulsed infrared signals reflected at the object.

An object can be identified on the basis of a captured barcode or a captured two dimensional code, for example. However, identification of an object can also be based on a combination of different object properties determined by means of the sensors, for example. Suitable object properties can comprise dimensions (e.g. determined by means of infrared TOF camera), color-pattern (e.g. determined by means of RGB camera) and/or information included in barcodes or matrix codes (e.g. determined by means of RGB camera), for example. Capture of electronic/digital information from e.g. an RFID chip by means of antenna is likewise also possible.

The position of an object can be determined by triangulations, for example, based on the image data captured by two respective camera sensors at the same time. This can also be done using 3D cameras, which comprise at least two imaging sensors. The position can additionally or alternatively also be determined using distance measurements by means of infrared sensors.

It goes without saying that all or several of the sensors used may optionally be integrated in one device in each case. It would thus be possible for at least one infrared sensor and RGB camera sensors and also optionally a microphone to be combined in a single device.

The sensors may always be active, so that they can always be used for activating processes and/or therefore changes of object positions are constantly able to be captured automatically. Alternatively, the sensors may also be active only at particular times. As a further alternative or additionally, some selected sensors from the plurality of sensors may always be active in order to set further processes in motion as required.

The data of the plurality of sensors can be received regularly or—and/or additionally—on a particular occasion. By way of example, there may be provision for users to be able to use a gesture or a voice input to cause sensor data to be transmitted.

The detection of gestures and/or voice inputs allows intuitive operator control by colleagues without restrictive operator control and without the use of physical input devices, such as e.g. gloves and 3D goggles.

In one exemplary embodiment, all of the identifications of objects in the repository facility that can be derived from data that have been obtained from the plurality of sensors at a particular time are determined. If the stored data indicate that the repository facility contains objects for which it has not been possible to determine an identification in this case, then a likely position of each of these objects is determined. It is therefore also possible to take into consideration currently invisible or at least unidentifiable objects that should be in the repository facility. The data record for such objects can be used to store an indicator indicating that a position associated with the object is only an assumed position.

In one exemplary embodiment, providing information in regard to the position of the object causes a visual and/or audible output. This output can name a repository location corresponding to the position of the object, for example.

In one exemplary embodiment, the providing of information in regard to the position of the object causes a repository location corresponding to the position of the object to be visually highlighted in the repository facility. By way of example, the highlighting can be performed by means of LEDs at the individual repository locations or by means of at least one point light source orientable to a respective repository location, such as a laser or an LED emitter, for example. Other visual highlighting is likewise possible. The stored positions may optionally have an associated statement in regard to the certainty of the position, and a repository location can optionally be visually highlighted in a different way depending on the statement in regard to the certainty of the position. As such, a position that is based on most recently obtained data at the sensors may have a higher associated certainty, for example, than a position that has only been determined as a likely position. The different types of highlighting can consist in color differences or in different patterns, for example. This means that a user can, by way of example, obtain an indicator indicating that a desired object in a highlighted repository location is possibly concealed by another object.

In one exemplary embodiment, at least a portion of the plurality of sensors captures a registration location. From received data of the sensors that capture the registration location, at least an identification and dimensions of an object are derived. From stored data and the derived dimensions of the object, a repository location with sufficient capacity to deposit the captured object is determined. Information in regard to the repository location with sufficient capacity is output. There may be provision for all of the objects that are supplied to the repository facility anew to first of all have to pass through the registration location. As soon as an identification of an object is derived for this location, the object is registered as being in the repository. The identification can be based on a barcode; other identifications, such as a two dimensional code, an address or a printed digit sequence, for example, are likewise possible, however. Other object properties, such as dimensions and color, can add to the identification. Preferably, but not necessarily, the portion of the plurality of sensors that capture a registration location comprises at least two appropriately arranged imaging sensors. The data recorded at the same time from at least two such sensors can be evaluated jointly, for example, in order to determine the dimensions of an object. The dimensions of the object can be determined by means of delay-time methods or by means of edge detection in the image data of multiple imaging sensors and triangulations based thereon, for example.

In one exemplary embodiment, the providing of information in regard to the repository location with sufficient capacity causes the repository location to be visually highlighted in the repository facility. The visual highlighting can again be performed by means of LEDs or lasers, for example.

A further exemplary embodiment provides measures for the event of it being determined that a repository location with sufficient capacity to deposit the captured object is not available. In that case, a way of relocating objects on the basis of stored data is determined in order to create a repository location with sufficient capacity to deposit the captured object Information concerning a possible relocation is subsequently output. In this case too, it is possible for affected repository locations to be visually highlighted by means of LEDs or lasers, for example.

In one exemplary embodiment, before a position of an object in the repository facility is first derived, calibration of the plurality of sensors and/or creation of a reference image on the basis of obtained data of the plurality of sensors is/are performed while there is no object in the repository facility. Calibration of the sensors makes it possible to ensure, by way of example, that the sensors operate with mutually coordinated parameters, such as white balance or exposure time, etc., which makes it easier to find the same points in different images later, for example. The calibration can be performed for a sensor on its own and/or it is possible for the sensors to be calibrated among one another. This can then make it easier to determine object positions and object dimensions. The capture of the empty repository facility, e.g. in the form of a reference image for an empty shelf, can make it considerably easier to derive positions of objects, since this allows possible positions to be firmly predetermined. Moreover, such a reference image can be used to determine and store the size of the individual repository locations.

In one exemplary embodiment, the repository facility is an automated repository facility in which at least one transportation device is configured to drop objects in repository locations and to collect objects from repository locations.

In one exemplary embodiment, the repository facility is used at least partially by operating personnel to drop objects in repository locations and to collect objects from repository locations.

In one exemplary embodiment, the quality of the stored data is checked repeatedly on the basis of respective newly obtained data of the plurality of sensors. If discrepancies are found between the stored data and the newly obtained data, a report can be delivered.

In one exemplary embodiment, moreover, a time statement stored in association with the identification of the at least one object is monitored, and a notification is caused if the stored time statement indicates that a prescribed action is due. The storage of the time statement can be caused together with the causing of a storage of a first position of the at least one object in the repository facility, for example. The notification can be caused if a prescribed period since the storage of the first position of the at least one object in the repository facility is exceeded and the object has not yet left the repository facility again, for example. The time statement can in this case comprise the date on which the object was reposited in the repository facility or the end of a prescribed period as a due date, for example. The prescribed period may be arbitrary, for example 7 days or 14 days. The notification can comprise a message in text form to a colleague at the repository facility, for example, who is thereby asked to discharge the object. In the case of a parcel, this can mean returning it to the sender, for example. The notification can be provided separately for each object, or once daily as a list containing all the objects affected on the day, for example. The notification can comprise an indication of the position of the object. Additionally, it is optionally possible for the repository locations with affected objects to be visually highlighted. As an alternative to discharge of the object, the caused notification can also make a request for arbitrary other prescribed actions. It would thus be possible for an intended recipient of the object to be reminded to collect the object after a particular period of reposition.

In one exemplary embodiment, "deep learning" is used to evaluate data from multiple networked repository facilities by means of algorithms, and information obtained by pattern analysis, for example, is made available to the individual systems in the repository facilities to improve the quality of the object positions.

Further advantageous exemplary configurations of the invention can be taken from the following detailed description of some exemplary embodiments of the present invention, in particular in conjunction with the figures. The figures are intended to be used only for the purposes of clarification, however, rather than for determining the scope of protection of the invention. The figures are not to scale and are merely intended to reflect the general concept of the present invention by way of example. In particular, features included in the figures are by no means intended to be deemed an absolutely necessary part of the present invention.

DETAILED DESCRIPTION OF SOME EXEMPLARY EMBODIMENTS OF THE INVENTION

The present invention is described below on the basis of exemplary embodiments that support efficient reposition and finding of objects in a repository facility.

Figure 1:
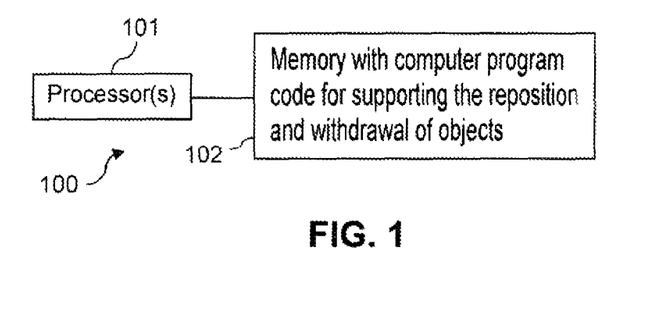
FIG. 1 shows a schematic depiction of an exemplary embodiment of an apparatus according to the invention.

FIG. 1 is a schematic depiction of an exemplary embodiment of an apparatus 100 according to the invention. The apparatus 100 may, by way of example, be a computer or a module for a computer, such as a plug-in card. The apparatus 100 may be situated in the repository facility or outside the repository facility. The apparatus 100 may be provided for one particular repository facility, or for an arbitrary number of repository facilities.

The apparatus 100 comprises at least one processor 101 and at least one memory 102. The memory 102 stores a computer program with program instructions. The memory 102 is an exemplary embodiment of a computer-readable medium according to the invention and the computer program is an exemplary embodiment of a computer program according to the invention. The processor 101 is configured to read and execute program instructions from the program memory 102 and thereby to cause particular actions.

Figure 2:
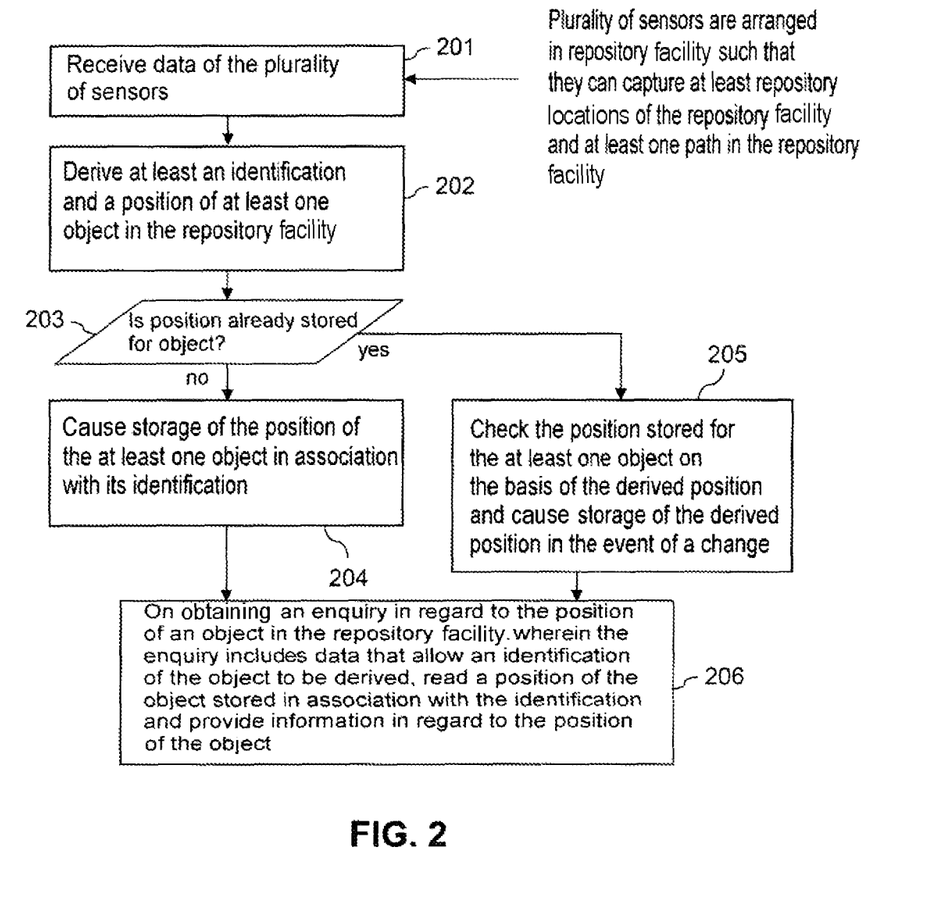
FIG. 2 shows a flowchart with method steps of an exemplary embodiment of the method according to the invention.

FIG. 2 is a flowchart that illustrates a first exemplary embodiment of a method according to the invention. The method steps are performed by the apparatus 100 when the processor 101 reads and executes applicable program instructions from the program memory 102.

The repository facility comprises a plurality of repository locations in which objects can be deposited, for example chaotically, i.e. without predetermined association. The repository facility has a plurality of sensors arranged in it that can capture at least repository locations of the repository facility and also at least one path in the repository facility. Preferably, but not necessarily, the sensors are arranged such that all the repository locations and all the access paths to the repository locations can be captured without shadowing. Besides the repository locations, the sensors can optionally also capture particular further work areas of the repository facility. The sensors can comprise sensors of TOF and/or RGB cameras, for example. The sensors record data constantly (that is to say in the style of a film) or at regular intervals and make them available.

The apparatus 100 receives data of the plurality of sensors. (Action 201)

The apparatus 100 derives individual object data from the received data. These object data comprise at least an identification and a position of at least one object in the repository facility. (Action 202) In this case, the apparatus 100 can derive a respective position for all of the captured objects, or else just for selected objects; or else just for selected objects at particular times and for all objects at particular times. Selected objects may in this case be objects that have recently entered the repository facility, for example. A position can be derived in the form of coordinates of a global or local coordinate system, for example, or else in the form of a reference to a particular repository location, for example.

The apparatus 100 can now use the identification to check whether a position is already stored for the at least one object. (Action 203)

If this is not the case, then the apparatus 100 causes a storage of the position of the at least one object in association with its identification. (Action 204) In this case, the identification may already be stored, so that only the position needs to be stored again. This may be the case, by way of example, if one embodiment has provision for the dropping of an object in a repository location always to be preceded by a registration with the identification at a registration location. If, in such an embodiment, an as yet unstored identification of an object turns out to have been derived, then an appropriate report can be caused. In other embodiments, on the other hand, there may be provision for objects to be first captured after they have been taken to an arbitrary suitable repository location. In that case, the identification and position are stored together for the first time.

If, by contrast, the apparatus 100 determines in action 203 that a position is already stored for the at least one object, then it checks the position stored for the at least one object on the basis of the derived position and causes a storage of the derived position in the event of a change. (Action 205) Such a case can arise if an object has been relocated after being accommodated in a first repository location, for example, in order to make space for a new object.

It goes without saying that if individual data for more than one object are derived in action 202, then actions 203-205 can be performed separately for each object.

The data can be stored in memory 102, in another memory of the apparatus 100 or externally. An external storage can be performed at one location or in a manner distributed over multiple locations.

The actions 201 to 205 can be arbitrarily repeated regularly and/or as required, so that the stock of data is always kept up to date.

If the apparatus 100 derives a respective position for all of the captured objects in action 202, it can optionally also cause erasure of stored object data if no further object with applicable identification has been captured and there is no provision for any other registration of removed objects.

If the apparatus 100 now obtains an enquiry in regard to the position of an object in the repository facility, wherein the enquiry includes data that allow an identification of the object to be derived, then the apparatus reads a position of the object, stored in association with the identification, and provides information in regard to the position of the object. (Action 206) The provision of the information can lead to a visual and/or audible output in the repository facility. The enquiry can be made in different ways. It can arise from an input of an identification by means of a keypad or as a voice input, for example. Alternatively, it can arise from a collection receipt or the like, which reveals an identification of the object, being kept for capture with or without a separate activation command.

It goes without saying that, in a variation, instead of the apparatus 100, it is also possible for an apparatus including the apparatus 100 or a system including the apparatus 100 to be caused to perform the method steps from FIG. 2.

Figure 3:
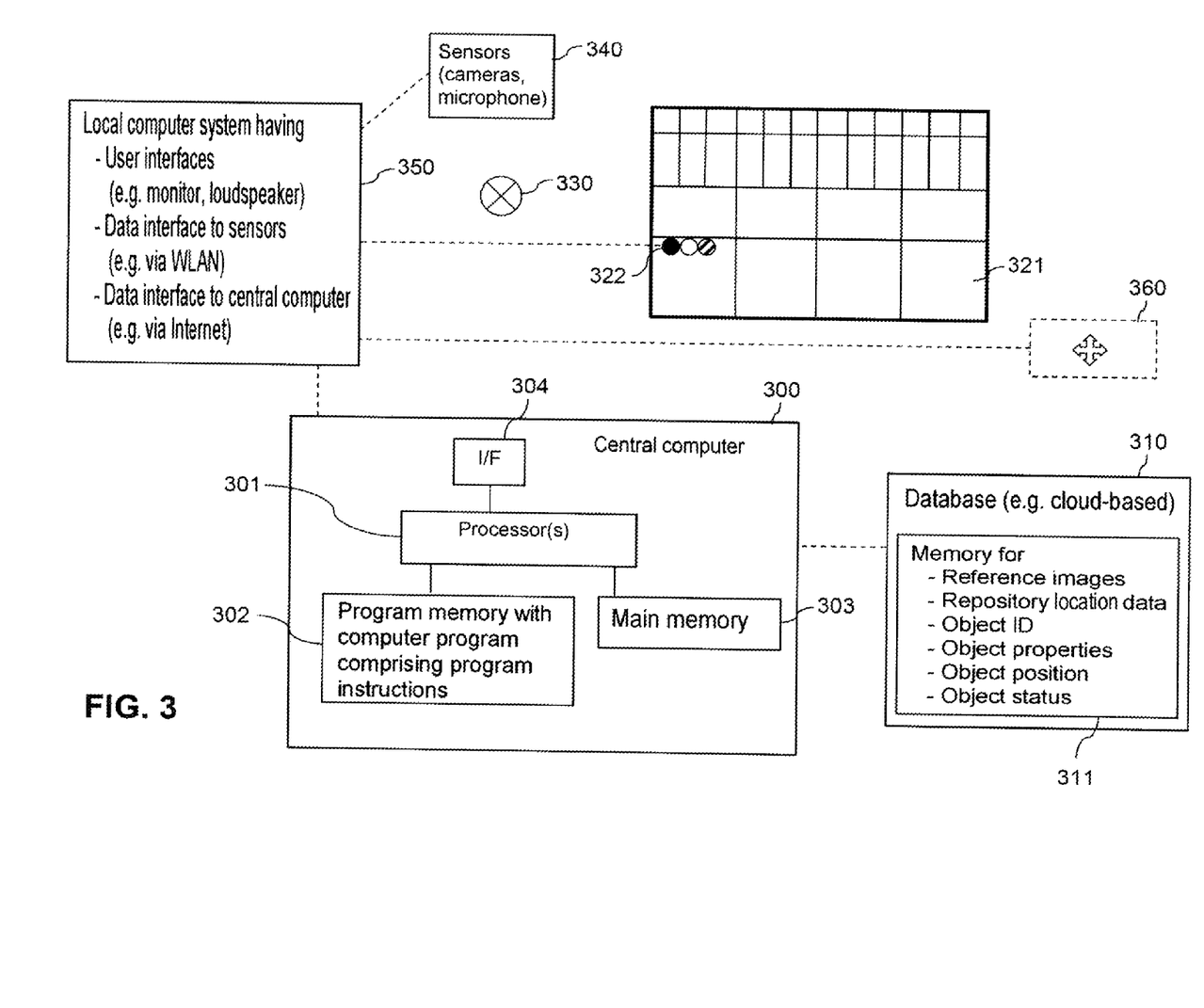
FIG. 3 shows a schematic depiction of an exemplary embodiment of a system according to the invention.

FIG. 3 is a schematic depiction of an exemplary embodiment of a system according to the invention.

The system comprises a repository facility, a central computer 300 and a database 310.

The repository facility comprises a relatively large number of repository locations 321 for depositing objects, a registration location 330, a plurality of sensors 340, a local computer system 350 and optionally an automatic transportation device 360. The repository facility may be a parcel shop or a post office, for example, in which a plurality of parcels is deposited as exemplary objects. It may alternatively be an arbitrary other repository facility for depositing arbitrary other objects, such as a repository facility at an arbitrary point in a supply chain.

The central computer 300 is an exemplary embodiment of an apparatus according to the invention. The central computer 300 comprises a processor 301, a program memory 302, a main memory 303 and at least one communication interface (I/F) 304. The processor 301 is connected to each of these components 302-306.

The program memory 302 is a nonvolatile memory that stores computer programs with program instructions. It can additionally store parameters and other data. The processor 301 is configured to read and execute program instructions from the program memory 302. The main memory 303 may be a volatile memory that can be used by the processor 301 to buffer-store program instructions and data.

The communication interface (I/F) 304 allows communication with the database 310 and with the local computer system 350 of at least one repository facility. It may be an interface to the Internet, for example.

The database 310 may be a cloud-based database, for example. It is configured to communicate with the central computer 300 via the Internet. It is further configured to store data in at least one memory 311. The data can comprise reference images for different repository facilities, data pertaining to the repository locations of each repository, and also object identifications (IDs) and respective object properties associated therewith, a respective object position and a respective object status. If need be, there may be provision in this case for persons on the reference images to be masked. The data can comprise arbitrary further data.

The repository locations 321 of the repository facility may be different-sized shelf compartments of one or more shelves, for example. Each repository location 321 may have at least one associated LED 322. If multiple LEDs 322 are provided per repository location 321, then they can have different colors or produce different patterns in order to display different information. An actuation circuit, not depicted separately, has an interface by means of which the LEDs 322 are individually actuatable by the local computer system 350. The interface may be connected by wire or may be connectable by radio. In the latter case, it may be an interface for a wireless local area network (WLAN), for example. There may be provision for a single actuation circuit for all the LEDs 322, a separate actuation circuit for a respective group of LEDs or a separate actuation circuit for each LED.

The registration location 330 may be a location through which each object that is intended to be routed to the repository facility or that leaves the repository facility must pass.

The sensors 340 are distributed over a plurality of cameras. By way of example, there could be provision for at least two sensors for capturing the delay time of reflected infrared pulses and at least two imaging sensors. The cameras can comprise TOF cameras, infrared cameras and/or RGB cameras, and/or arbitrary other apparatuses that capture image data. An apparatus can optionally also comprise different types of cameras or different types of sensors 340. The cameras are arranged such that they can jointly capture at least all of the repository locations 321, the access paths to the repository locations 321 and the registration location 330 without shadowing. In one embodiment, at least at the registration location 330, data for a 3D image can be captured, and otherwise data for at least one 2D image. Alternatively, however, it is also possible for data for 3D images to be captured for all of the repository locations 321 or for the entire repository facility. To obtain data for 3D images, it is optionally possible for a respective 3D camera to be used, or multiple cameras can be arranged such that the data captured by them can be used to generate a 3D image. Optionally, the sensors 340 can also comprise at least one microphone. A microphone may be mounted at least in proximity to the registration location 330, for example. The sensors 340 have an interface for communication with the local computer system 350, for example a WLAN interface.

The local computer system 350 may be formed in different ways. By way of example, it can comprise a server and at least one personal computer connected thereto via Ethernet. The personal computer can provide user interfaces or may be connected to such. The user interfaces can have arbitrary input and output means, such as a screen, for example, possibly with a touch screen, loudspeakers, a keypad and/or buttons, etc. The server can provide a WLAN and, to this end, have a WLAN access point or may be connected to such. Using the WLAN, the server can then obtain data from the sensors 340 and send control commands to the LEDs 322. If need be, the server can also use the WLAN to output control commands to the sensors 340, for example in order to switch them on and off and/or in order to orient them and/or in order to calibrate them. The server can furthermore provide an interface to the Internet and hence to the central computer 300. Generally, the server may, for one configuration of the invention, be restricted to interchanging information between the central computer 300, on the one hand, and the other described components of the repository facility—i.e. LEDs 322, sensors 340, personal computers and possibly transportation device 360. It may alternatively itself be responsible for part of the information processing according to the invention. Outside of the processes according to the invention, it can furthermore optionally be used as a regular server.

The optional transportation device 360 is designed to transport objects independently from the registration location 330 to a repository location 321 and to drop them there and also to remove objects from a repository location 321 and transport them to the registration location 330. In this case, the transportation device 360 may be in arbitrary form. By way of example, it can move along a rail system, or can move freely in space. In the latter case, the movement can take place under remote control, or using an integrated controller operating only on the basis of an input destination. To this end, the transportation device 360 has an interface that it can use to receive commands in regard to a destination and in regard to the type of action required in each case (reposition or withdrawal) from the local computer system.

The depicted or described connections between components can be understood to mean functional connections. They can be realized directly or indirectly via multiple other components.

The depicted system can be modified in a wide variety of ways within the scope of the invention, either by adding components or by omitting components, and also by modifying components. This can result in further or alternative advantages each time.

It would thus be possible for the central computer 300 to also have more than one and/or other interface(s) instead of one interface 304 to the Internet, for example. The database 310 can alternatively be connected directly to the central computer 300, for example, or even integrated therein. As a further alternative, it would be possible for the logic for the database to be located in the central computer 300 and for only the memory 311 to be arranged externally. If the central computer 300 is provided only for one repository facility, and is accommodated in situ in the repository facility, then the central computer 300 could use a local area network to communicate with other components of the repository facility and at least partially also take on the functions of the local computer system 350, for example the function of the server.

Instead of a single registration location 330, it is also possible for multiple registration locations to be provided; for example, but not necessarily, a separate registration location for repositions and withdrawals.

As an alternative or in addition to the LEDs 322, it would be possible for at least one orientable laser pointer to be provided in the repository facility, for example. Each of the laser pointers is then orientable by means of a motor in the X, Y and Z directions of a coordinate system such that they can highlight each of the repository locations 321. The laser pointers can optionally have different colors for different types of highlighting, or they can optionally be actuated continually or in pulsed fashion, for example, so as to achieve different types of highlighting.

Figure 4:
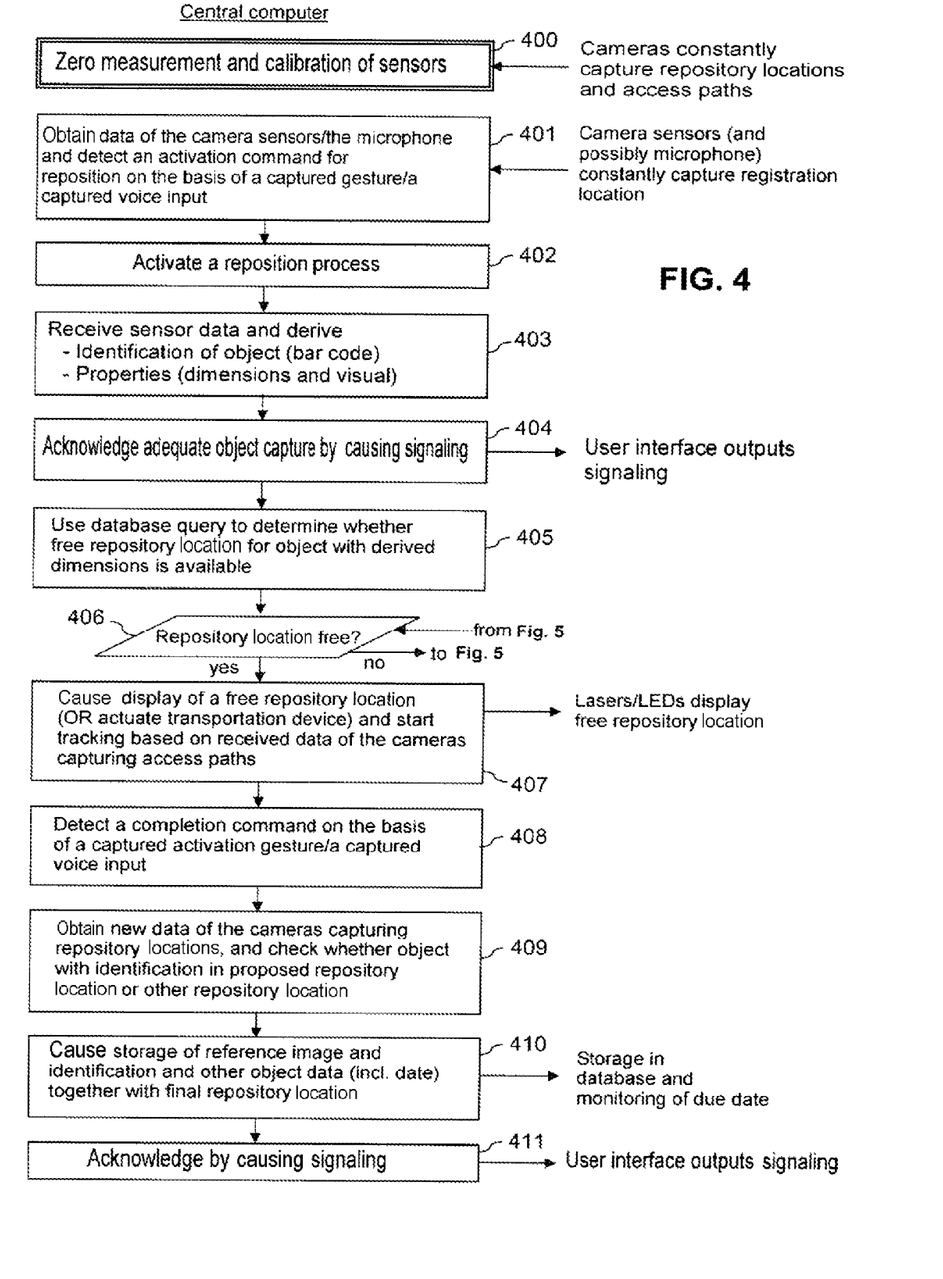
FIG. 4 shows a flowchart with first method steps of an exemplary embodiment of the method according to the invention performed in the system from FIG. 3.
Figure 5:
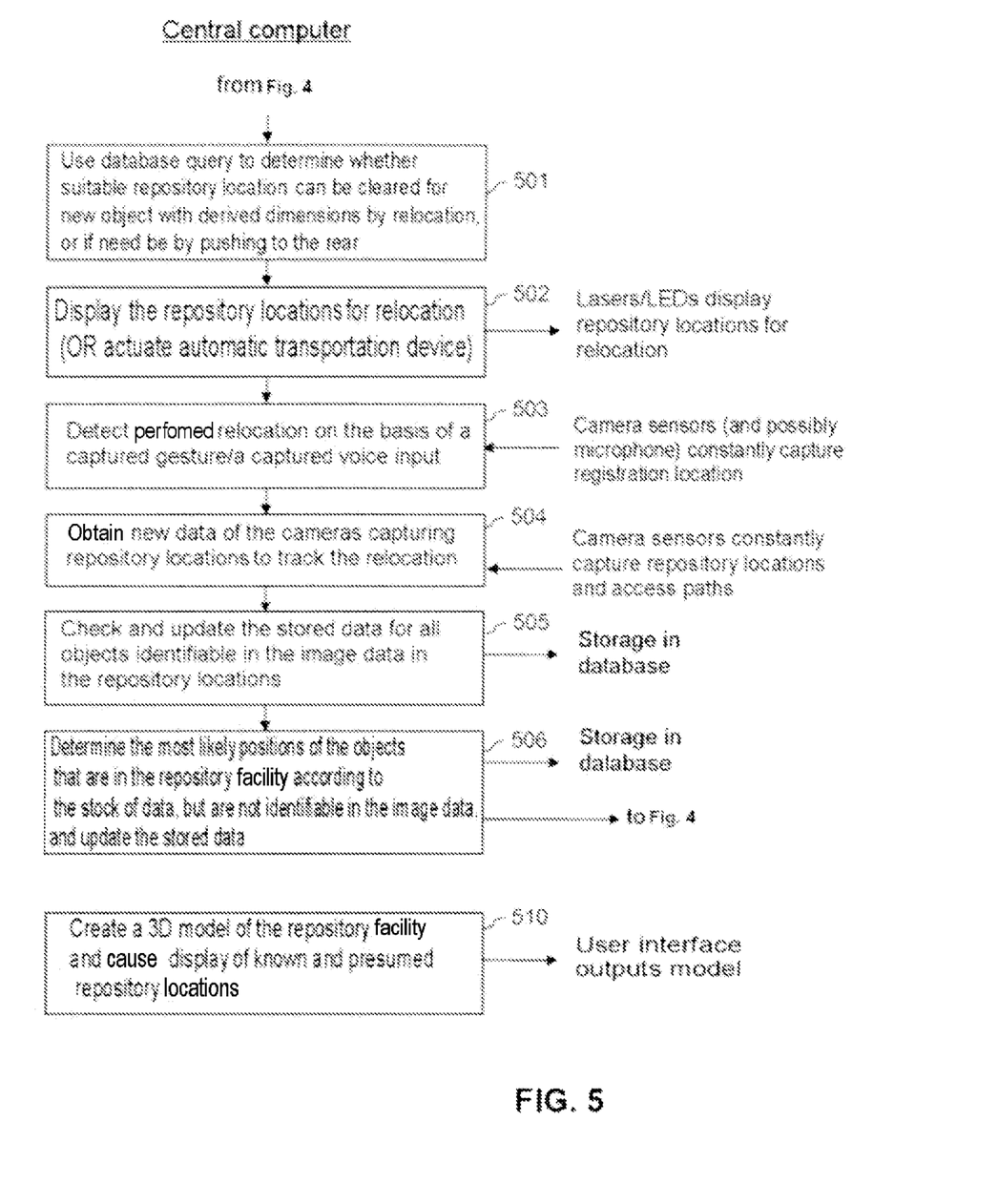
FIG. 5 shows a flowchart with second method steps of an exemplary embodiment of the method according to the invention performed in the system from FIG. 3.
Figure 6:
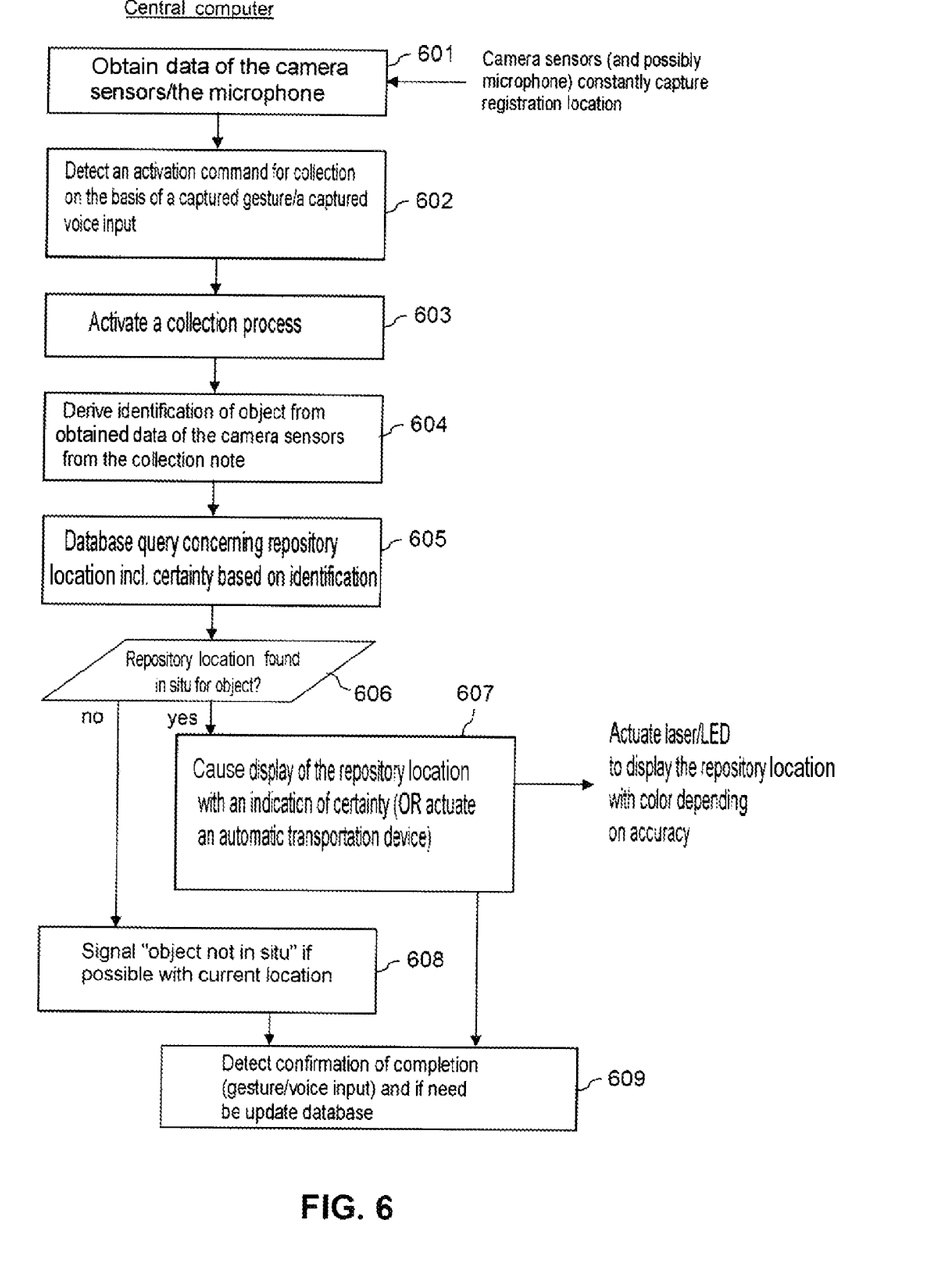
FIG. 6 shows a flowchart with third method steps of an exemplary embodiment of the method according to the invention performed in the system from FIG. 3.

FIGS. 4 to 6 are flowcharts that illustrate an exemplary embodiment of a method according to the invention, performed in the system from FIG. 3. In this case, FIG. 4 relates essentially to reposition of objects in the repository facility, FIG. 5 relates to relocation of objects in the repository facility and FIG. 6 relates to removal of objects from the repository facility. The depicted actions are performed by the central computer 300 when the processor 301 reads and executes applicable program instructions from the program memory 302 and thereby causes the central computer 300 to perform the actions. The communication by the central computer 300 with other components is performed via the Internet, and the communication within the repository facility is performed via the WLAN.

An object is reposited as follows, by way of example, as shown in FIG. 4:

The cameras with the sensors 340 constantly capture the repository locations 321, the access paths and the registration location 330 and deliver the data to the local computer system 350.

Before an object is first reposited, a zero measurement and calibration of the camera sensors 340 in front of the empty repository locations 321 and access paths take place. (Action 400) The calibration is used to orient the sensors 340 such that each point in the frontal area of the repository locations and each point in the transportation area of the access paths can be captured by sensors 340, and the parameters of the sensors 340 are coordinated to one another. The zero measurement delivers a documentation of the initial situation in the form of a reference image. To this end, the central computer 300 causes the local computer system 350 to deliver the data of the cameras that are captured at an arbitrary time. The central computer 300 causes the data to be stored as a reference image in the database 310. The structure of the repository locations may have been input manually or by means of digital plans and stored in the database 310 beforehand. The statements in regard to the structure can in this case comprise the number, the location and the size of the repository locations 321, and each repository location 321 may have had a firm reference number assigned to it. The reference number can in this case also be used to identify the LEDs 322 arranged at the respective repository location 321, and when there are multiple LEDs 322 per repository location 321 it is possible for each LED to be explicitly identified by means of a modifier. The central computer 300 can collate the reference image with the stored structure, for example, and therefore obtain, for each repository location 321, information concerning which image data should be expected for the repository location 321 not in use. Moreover, at this time, each repository location 321 can be assigned to the status "empty" in the database 310. Optionally, the central computer 300 could also process the data of the camera sensors 340 in order to determine the structure of the repository locations 321 itself and then to allocate reference numbers to said repository locations itself. After the zero measurement and calibration, use is enabled.

If objects are now supposed to be reposited, then a colleague takes the object to the registration location 330. The camera sensors 340 and possibly the microphone constantly capture data at the registration location 330 and deliver said data to the central computer 300 via the local computer system 350. The colleague can now activate the reposition process by performing a gesture provided for that purpose or making a voice input provided for that purpose. The gesture or the voice input is detected by the central computer 300 (Action 401), and the process is activated (Action 402). It goes without saying that to reduce the data transferred between the local computer system 350 and the central computer 300, the gesture or the voice input can alternatively be detected by the local computer system 350, and that sensor data can be transmitted to the central computer 300 only from this time onwards.

The central computer 300 then possibly obtains data of the cameras at the registration location 330 again and evaluates said data. (Action 403) In particular, it determines an identification of the object. The identification can be provided by virtue of a barcode located on the object being detected and determined, for example. Instead of a barcode, it is also possible for a two dimensional code or a character string to be used for this purpose. Additionally, properties of the object are determined. In particular, the dimensions of the object are determined. It is thus possible for image processing, for example, to be used to determine edges and/or corners of the object, and the distance between two camera sensors 340 and the angle at which the edges and/or corners are captured by each of the sensors 340 can be used to determine the respective distances to the sensors 340. From the distances of different edges and/or corners, it is then possible to determine the dimensions of the object. It goes without saying that the dimensions can also be determined in an arbitrary other manner; in particular, by way of example, also by means of the data of sensors that capture infrared pulses emitted and reflected for a delay-time method. Optionally, image data can be used to determine further properties, for example visual properties, such as coloration, pattern and/or shape.

If the object capture was successful, then the central computer 300 acknowledges the adequate object capture by causing signaling by the local computer system 350. (Action 404) The signaling is then output visually and/or audibly by a user interface of the local computer system 350.

The central computer 300 subsequently queries the database 310 to determine whether there is a free repository location 321 for an object with the determined dimensions in the repository facility. (Action 405)

If a repository location is not free (Action 406), then the central computer 300 continues with FIG. 5.

If a repository location is free (Action 406), then the central computer 300 uses the local computer system 350 to cause display of a free repository location (Action 407). The smallest free repository location into which an object having the determined dimensions fits is always selected for display. If multiple suitable repository locations 321 with the same capacity are free, then the repository location 321 that is closest to the registration location 330 is always selected for display, for example, in order to minimize distances. The display can be provided by actuating an LED 322 at the selected repository location 321. If, instead of LEDs 322, laser pointers are provided, then the central computer 300 uses the local computer system 350 to cause appropriate orientation and activation of a laser pointer in order to display the selected repository location 321. In a large repository facility in which the colleague cannot overlook the repository locations 321 completely, it is additionally possible for an announcement or a display concerning which repository location or which shelf section or the like has been selected to be provided on a screen at the registration location 330, for example.

At the same time, tracking of the object from the registration location 330 to a repository location 321 by means of evaluation of the data from camera sensors 340 oriented to the access paths can be started, for example.

The colleague subsequently takes the object to the displayed repository location 321 and drops the object there. Possibly, the colleague alternatively selects a different repository location 321, for example a repository location that is too large but closer.

The colleague then gives a completion command using an activation gesture or a voice input. The colleague can give the completion command directly after depositing the object, for example, that is say directly in front of the repository location 321, or else after he has returned to the registration location 330. The latter can make it easier to detect gestures and/or can reduce the number of microphones required.

The central computer 300 detects the completion command on the basis of data of the sensors 340, which data continue to be obtained via the local computer system 350. (Action 408)

If the central computer 300 obtains, after the completion command, new data of the camera sensors 340 that capture the repository locations 321, it checks whether the object is detected in the proposed repository location or in a different repository location. (Action 409) The object is detected on the basis of an identification of the object that is included in the data, e.g. the barcode. For rapid detection, the central computer 300 therefore starts by checking whether it detects the identification on an object in the proposed repository location. Only if this is not the case are further repository locations evaluated. To this end, it is possible for a position of the object to be checked as a matter of priority at the end of tracking of the object, for example. Since the barcode is not always visible during tracking, the evaluation of the data for tracking can also take into consideration other object properties, such as dimensions and coloration. As a result, the position of an object in a repository location may be known or can be assumed likely even if the barcode is not oriented forwards in the repository location. Moreover, it is thus possible to capture when an object is not dropped in a repository location for some reason or other, but rather is dropped somewhere or other and then forgotten, for example on account of an intervening event.

The central computer 300 then causes a storage of a new reference image in the database 310, which reference image corresponds to the last recording of the repository locations 321 by the cameras. Additionally, the central computer 300 causes a storage of the identification of the object and, in association therewith, all of the determined object data (such as dimensions and color) and also the reference number of the detected final repository location 321 of the object in a database entry of its own in the database 310. Additionally, it is also possible for an object status to be stored in the database entry, such as the time of reposition, for example. (Action 410) The data can be stored using different structures. As such, it is possible for a separate structure to be provided for each repository facility, for example, so that the objects are automatically associated with a particular repository facility. If there is provision for a status for the repository locations 321, then the status can be changed from "empty" or "partially occupied" to "occupied" or—depending on the dimension of the object in relation to the size of the repository location 321—to "partially occupied". A stored time of reposition can be used, for example, as a basis for a regular (e.g. daily) check to determine whether removal of the object is overdue (e.g. after a 7-day reposition has elapsed). In that case, it is possible for a colleague to be notified, for example, who removes and discharges the object (e.g. in the case of a parcel returns it to the sender).

Once the storage is complete, the central computer 300 acknowledges this by causing signaling. (Action 411) In this case, the signaling is provided by means of the local computer system 350, for example by means of a loudspeaker and/or a screen of the local computer system 350.

If it is determined in action 406 that a suitable repository location for a particular object is not free, then relocation takes place where possible, as depicted by way of example in FIG. 5:

The central computer 300 queries the database 310 in order to determine whether a suitable repository location 321 for the new object with the derived dimensions can be cleared by relocation. (Action 501) To this end, reposited objects that have been dropped in an excessively large repository location 321 beforehand in the absence of an alternative (or at the initiative of the colleague, for example in order to reduce the distance) are sought, for example. If a smaller but still suitable repository location 321 has become free in the meantime, then a relocation is readily possible. If need be, the relocation needs to take place in two or more steps, involving first of all a small object being relocated from a medium-sized repository location 321 to a small repository location 321, and then a medium-sized object being relocated from a large repository location 321 to a medium-sized repository location 321, in order finally to clear a possibly needed large repository location 321 for a recently admitted object. If necessary, it is also possible to provide for an object to be pushed to the rear of its repository location 321 or of a new repository location 321 in this case in order to free a partial repository location further forward.

If it has been possible to determine a suitable relocation option, then the central computer 300 causes the repository locations affected by the relocation to be displayed. (Action 502) The display can be provided in different ways. By way of example, a repository location with an object to be removed could be denoted by an activated red LED 322, and a repository location to which an object is supposed to be relocated could be denoted by an activated green LED 322, or the like.

The relocation that has taken place can be detected by the central computer 300 on the basis of a gesture and/or a voice input by the colleague, for example, these resulting from the data of the sensors 340 that continue to be forwarded from the local computer system 350. (Action 503)

If the central computer 300 subsequently obtains new data of the camera sensors 340 that capture the repository locations 321 and access paths, then these data are provided for tracking the relocation. (Action 504)

The central computer 300 checks the stored data for all identifiable (e.g. on the basis of a barcode) objects in the repository locations 321. If this results in a new position of an identified object, then an update in the database 310 is caused. (Action 505) If objects have been detected without it having been possible for them to be explicitly identified on the basis of a barcode, then it is also possible for stored object properties, such as dimensions and color, to be used in order to determine which objects they (probably) are.

The central computer 300 further determines which objects are in the repository facility, according to the database 310, that are not detectable on the basis of the current data of the sensors 340. Such a situation can have various reasons. For example, the colleague may have pushed an object in the repository location 321 to the rear, for example, in order to place another object in front or to be able to place one in front. In this case, the barcode for identifying the object is not necessarily detectable in the image data of the sensors 340.

For these objects, the central computer 300 determines the most likely repository location. (Action 506) This can be done using information in regard to the most recently stored repository location 321; and/or information in regard to a proposal in action 502 to add a further object to an already occupied repository location 321; and/or information from the last tracking of the object.

In general, the central computer 300 can learn from historical object properties, positions and movements in order to calculate likely object positions outside the capture range of the sensors 340.

For the objects for which only a most likely position has been determined, a storage of the position in the database together with a statement indicating that it is an assumed position is caused.

As soon as the relocation has taken place and the updated data are stored, the central computer 300 can continue again with action 406 from FIG. 4.

It goes without saying that action 506 can additionally also be performed e.g. subsequently to action 409 in the sequence from FIG. 4. Apart from this, the checks in accordance with the actions 504-506 can take place at arbitrary times in order to check the quality of the data in the database. By way of example, they can, in principle, take place once daily outside the working hours of the colleagues.

Within that framework, it is also possible to capture if an object identifiable on the basis of the image data of the sensors 340 is in the repository facility that has not been registered beforehand and is therefore not recorded in the database 310, for example. This may be the case when a colleague has forgotten to have the object captured at the registration location 330 first before he dropped it in an arbitrary repository location, for example.

The data present in the database 310 can be used by the central computer 300 to create a 3D model of the repository facility. The model can then—caused by the central computer 300—be displayed on a screen of the local computer system 350, for example, with an indication of known and presumed repository locations 321. (Action 510) Such a display allows colleagues to verify likely positions and if need be make corrections to the actual repository locations 321. Input means of the local computer system 350 can also allow the colleagues to notify the central computer 300 of required corrections so that it updates the database 310 accordingly. As such, after a verification, it is possible for an object to be provided with a safe position statement, for example, even if it cannot currently be identified on the basis of the data of the sensors 340. The action 510 can be performed at an arbitrary time in this case, for example in each case at the request of a colleague via a user interface of the local computer system 350; or else automatically during known idle periods. A comparison of current data with the most recently stored reference image also allows the central computer 300 to quickly capture those repository locations 321 in which changes may need to be taken into consideration.

An object is removed from the repository facility as follows by way of example as shown in FIG. 6:

A colleague wishes to remove an object from the repository facility, for example, when a customer hands over a collection note for an object, such as a parcel. The colleague then takes the collection note to the registration location 330 and hence into the area of some of the sensors 340.

The sensors 340 continue to constantly capture the registration location 330, and the central computer 300 continues to obtain the data of the sensors 340 via the local computer system 350. (Action 601)

The colleague performs a gesture that is intended to activate the collection process, or he makes a corresponding voice input. If the central computer 300 detects the gesture or the voice input for collecting an object on the basis of the obtained data of the sensors 340 (Action 602), then it activates the collection process (Action 603). For a variant, it is in turn possible for the gesture or the voice input to be alternatively detected by the local computer system 350, and for sensor data to be transmitted to the central computer 300 only from this time onward.

The central computer 300 then searches the data of the cameras 340 capturing the registration location 330 for a barcode on a collection note in order to derive therefrom the identification of an object for collection. (Action 604)

The central computer 300 performs a database query concerning the position of the object in the repository facility based on the identification. (Action 605) In this case, a position is stored in the form of the reference number of a repository location 321 each time.

If a stored position of the object in the repository facility is found in the database 310 (Action 606), then this comprises not only the reference number of the repository location but also a stored statement in regard to the certainty of the position.

The central computer 300 causes a display of the repository location 322 corresponding to the reference number with an indication of the certainty by means of the local computer system 350. (Action 607) To this end, the local computer system 350 takes the certainty of the position as a basis for actuating an LED 322 associated with the repository location 321. If the position is an exactly known position, then a green LED at the repository location 321 can be lit, for example. If the position is a computationally determined, likely position, on the other hand, then a yellow LED at the repository location 321 can be lit, for example. If lasers instead of LEDs are used to display a repository location 321, then the local computer system 350 actuates the movement device of a laser using a color associated with the certainty, in order to orient the laser to the desired repository location 321, and activates the laser.

The colleague finds the object identified on the collection note quickly on account of the highlighting of the repository location 321. He removes the object and performs a provided gesture at the registration location 330 as confirmation of completion. Instead of the gesture, a voice input may again be made.

The sensors 340 at the registration location 330 detect the confirmation of completion and transmit applicable data to the local computer system 350, which forwards the data to the central computer 300. The central computer 300 detects the confirmation of completion in the obtained data, updates the database 310 and ends the collection process. (Action 609) By way of example, the update of the database 310 can consist in a position entry being erased and a status for the object being set to "collected". In a variation, there may be provision for not only the gesture or the voice input but also the identification of the object to have to be detected again at the registration location 330 before the database 310 is updated, in order to ensure that the correct object has been removed. If a discrepancy is detected here between the identification on the collection note and the identification on the object, an audible or visual warning can be caused by means of a user interface of the local computer system 350.

If, by contrast, a stored position of the object in the repository facility is not found in the database 310 in action 605 (Action 606), then the central computer 300 signals to the local computer system 350 that the object is not in situ (Action 608). In this regard, the local computer system can simply use a user interface to output a particular sound or a particular visual signal. Alternatively, an applicable message can be output audibly via a loudspeaker or visually on a screen.

In some cases, the central computer 300 may find, in action 605, that although the sought object is not in the repository facility in which the customer is situated, the sought object has been found in association with another repository facility, or else the collected status is stored for the sought object. In both cases, the central computer 300 could use loudspeakers or a screen of the local computer system 350 to cause the output of applicable information.

In this case too, there can be provision for the colleague to complete the collection process by means of a provided gesture or a provided voice input at the registration location 330. The sensors 340 at the registration location 330 capture the confirmation of completion and transmit applicable data to the local computer system 350, which forwards the data to the central computer 300. The central computer 300 detects the confirmation of completion in the obtained data and ends the collection process. (Action 609) In this case, an update of the database 310 is dispensed with.

It goes without saying that different gestures or voice inputs by the colleague can be provided for each of the actions 401, 408, 503, 602 and 609. Alternatively, the central computer 300 can also detect from the context which process is intended to be started or ended in each case, however.

Particular embodiments of the invention thus provide for multiple object positions to be determined continuously in real time, to which end multiple sensors capture the repository area and if need be at least one other work area without shadowing. The determined object data, such as identification, position, dimensions and visual features, are entered in a database, and the position and also if need be an object status are each updated as required. The position of an arbitrary object can therefore always be read and displayed on the basis of an identification. Historical data can be used in this case to propose optimum repository locations for similar objects and/or to determine likely positions of any moved, concealed objects as precisely as possible. The analysis of historical reposition and withdrawal processes also allows continuous optimization of the system in this case. A complete overview, produced on the basis of the database entries, allows possible problems to be indicated and, if need be, correction by a user.

Blocks 201-206 in FIG. 2 can also be regarded as a representation of applicable program instructions in program memory 102. Blocks 401-411, 501-510 and 601-609 can also be regarded as a representation of applicable program instructions in program memory 302.

The method depicted by way of example can be modified in a wide variety of ways within the scope of the invention, either by adding actions, by omitting actions and by modifying actions. This can result in further advantages each time. The sequence of the outlined actions in the flowchart in FIG. 2 is also not imperative; alternative sequences are perceivable. Finally, the actions can be implemented in different ways and performed by different apparatuses.

If an automatic transportation device 360 is used, then instead of a display of the selected repository location 321, for example, an applicable stipulation for or actuation of the transportation device 360 can be provided in action 407. As soon as the colleague has transferred the object to the transportation device 306, the transportation device 360 can then transport the object to the selected repository location. Accordingly, the relocation in action 502 and the removal in action 607 can be performed by means of an actuation of an automatic transportation device 360.

It goes without saying that the embodiments described are generally merely examples that can be modified and/or augmented in a wide variety of ways within the scope of the claims. In particular, any feature that has been described for a particular exemplary embodiment can be used independently or in combination with other features in any other exemplary embodiment. Any feature that has been described for an exemplary embodiment in a particular category can also be used in corresponding fashion in an exemplary embodiment in a different category.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:
receiving data of a plurality of sensors that are arranged in a repository facility such that they can capture at least repository locations of the repository facility and at least one path in the repository facility;
deriving at least an identification and a position of at least one object in the repository facility from the received data;
causing of a storage of the position of the at least one object in association with its identification if a position is not yet stored for the at least one object;
if a position is already stored for the at least one object, checking the position stored for the at least one object on the basis of the derived position and causing of a storage of the derived position in the event of a change; and
on obtaining an enquiry in regard to the position of an object in the repository facility, wherein the enquiry includes data that allow an identification of the object to be derived, reading a position of the object, stored in association with the identification, and providing information in regard to the position of the object.

2. The method according to claim 1, wherein the deriving of a position of the at least one object in the repository facility from the received data comprises tracking a path of at least one object in the repository facility on the basis of received data from at least one of the plurality of sensors that captures at least one path in the repository facility.

3. The method according to claim 1, further comprising:
determining all of the identifications of objects in the repository facility that can be derived from data that have been obtained from the plurality of sensors at a particular time, and
determining a likely position of each object that, according to stored data, is present in the repository facility and for which it has not been possible to determine an identification.

4. The method according to claim 1, wherein the providing of information in regard to the position of the object causes a repository location corresponding to the position of the object to be visually highlighted in the repository facility, wherein the stored positions have an associated statement in regard to the certainty of the position, and wherein a repository location is visually highlighted in a different way depending on the statement in regard to the certainty of the position.

5. The method according to claim 1, wherein at least a portion of the plurality of sensors captures a registration location, the method comprising:
deriving at least an identification and a size of an object from received data of the portion of the plurality of sensors that captures the registration location;
determining a repository location with sufficient capacity to deposit the captured object from stored data and the derived size of the object; and
providing information in regard to the repository location with sufficient capacity.

6. The method according to claim 5, wherein the providing of information in regard to the repository location with sufficient capacity causes the repository location to be visually highlighted in the repository facility.

7. An apparatus comprising at least one memory with program instructions and at least one processor configured to execute program instructions from the at least one memory, wherein the program instructions are configured to cause the apparatus, when they are executed by the at least one processor, to perform:
receiving data of a plurality of sensors that are arranged in a repository facility such that they can capture at least repository locations of the repository facility and at least one path in the repository facility;
deriving at least an identification and a position of at least one object in the repository facility from the received data;
causing of a storage of the position of the at least one object in association with its identification if a position is not yet stored for the at least one object;
if a position is already stored for the at least one object, checking the position stored for the at least one object on the basis of the derived position and causing of a storage of the derived position in the event of a change; and
on obtaining an enquiry in regard to the position of an object in the repository facility, wherein the enquiry includes data that allow an identification of the object to be derived, reading a position of the object, stored in association with the identification, and providing information in regard to the position of the object.

8. The apparatus according to claim 7, wherein the deriving of a position of the at least one object in the repository facility from the received data comprises tracking a path of at least one object in the repository facility on the basis of received data from at least one of the plurality of sensors that captures at least one path in the repository facility.

9. The apparatus according to claim 7, wherein the program instructions are further configured to cause the apparatus, when they are executed by the at least one processor, to perform:
determining all of the identifications of objects in the repository facility that can be derived from data that have been obtained from the plurality of sensors at a particular time, and
determining a likely position of each object that, according to stored data, is present in the repository facility and for which it has not been possible to determine an identification.

10. The apparatus according to claim 7, wherein the providing of information in regard to the position of the object causes a repository location corresponding to the position of the object to be visually highlighted in the repository facility, wherein the stored positions have an associated statement in regard to the certainty of the position, and wherein a repository location is visually highlighted in a different way depending on the statement in regard to the certainty of the position.

11. The apparatus according to claim 7, wherein at least a portion of the plurality of sensors captures a registration location, wherein the program instructions are further configured to cause the apparatus, when they are executed by the at least one processor, to perform:
deriving at least an identification and a size of an object from received data of the portion of the plurality of sensors that captures the registration location;
determining a repository location with sufficient capacity to deposit the captured object from stored data and the derived size of the object; and providing information in regard to the repository location with sufficient capacity.

12. The apparatus according to claim 11, wherein the providing of information in regard to the repository location with sufficient capacity causes the repository location to be visually highlighted in the repository facility.

13. The apparatus according to claim 11, wherein the program instructions are further configured to cause the apparatus, when they are executed by the at least one processor, to perform, in the event of it being determined that a repository location with sufficient capacity to deposit the captured object is not available:
  determining a way of relocating objects on the basis of stored data in order to create a repository location with sufficient capacity to deposit the captured object, and
  outputting information concerning a possible relocation.

14. The apparatus according to claim 7, wherein, before a position of an object in the repository facility is first derived from received data,
  calibration of the plurality of sensors on the basis of obtained data of the plurality of sensors is performed while there is no object in the repository facility, and/or
  creation of reference image on the basis of obtained data of the plurality of sensors is performed while there is no object in the repository facility.

15. The apparatus according to claim 7, wherein the repository facility is an automated repository facility in which at least one transportation device is configured to drop objects in repository locations and to collect objects from repository locations.

16. The apparatus according to claim 7, wherein the repository facility is used at least partially by operating personnel to drop objects in repository locations and to collect objects from repository locations.

17. The apparatus according to claim 7, wherein the quality of the stored data is checked repeatedly on the basis of respective newly obtained data of the plurality of sensors.

18. The apparatus according to claim 7, wherein the program instructions are further configured to cause the apparatus, when they are executed by the at least one processor, to perform:
  monitoring a time statement stored in association with the identification of the at least one object; and
  causing a notification if the stored time statement indicates that a predetermined action is due.

19. The apparatus according to claim 7, wherein the program instructions are further configured to cause the apparatus, when they are executed by the at least one processor, to perform:
  evaluating obtained data from a plurality of networked repository facilities by means of "deep learning" and
  providing the obtained information for the individual repository facilities to improve the quality of derived object positions.

20. A system comprising:
  an apparatus comprising at least one memory with program instructions and at least one processor configured to execute program instructions from the at least one memory, wherein the program instructions are configured to cause the apparatus, when they are executed by the at least one processor, to perform:
    receiving data of a plurality of sensors that are arranged in a repository facility such that they can capture at least repository locations of the repository facility and at least one path in the repository facility;
    deriving at least an identification and a position of at least one object in the repository facility from the received data;
    causing of a storage of the position of the at least one object in association with its identification if a position is not yet stored for the at least one object;
    if a position is already stored for the at least one object, checking the position stored for the at least one object on the basis of the derived position and causing of a storage of the derived position in the event of a change; and
    on obtaining an enquiry in regard to the position of an object in the repository facility, wherein the enquiry includes data that allow an identification of the object to be derived, reading a position of the object, stored in association with the identification, and providing information in regard to the position of the object, and
  the plurality of sensors, and/or
  a transportation device for transporting objects, and/or
  at least one data memory.

* * * * *